(12) United States Patent
Calvignac et al.

(10) Patent No.: US 6,195,335 B1
(45) Date of Patent: Feb. 27, 2001

(54) DATA SWITCH

(75) Inventors: Jean Calvignac, Cary, NC (US); Daniel Orsatti, Cagnes-sur-mer; Gilles Toubol, Villeneuve Loubet, both of (FR); Fabrice Verplanken, Cary, NC (US); Claude Basso, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/110,917

(22) Filed: Jul. 6, 1998

(51) Int. Cl.[7] .................................................. H04L 12/56
(52) U.S. Cl. ........................... 370/236; 370/427; 370/429
(58) Field of Search .................................... 370/229, 230, 370/235, 236, 395, 398, 492, 493, 494, 422, 423, 424, 425, 426, 427, 428, 429, 360, 380, 381, 382, 383

(56) References Cited

U.S. PATENT DOCUMENTS

| | | | |
|---|---|---|---|
| 5,241,536 | * | 8/1993 | Grimble et al. ..................... 370/398 |
| 5,299,190 | * | 3/1994 | LaMaire et al. ..................... 370/413 |
| 5,577,035 | * | 11/1996 | Hayter et al. ..................... 370/395 |
| 6,044,061 | * | 3/2000 | Aybay et al. ..................... 370/230 |
| 6,046,997 | * | 4/2000 | Fan ..................................... 370/395 |
| 6,067,298 | * | 5/2000 | Shinohara .......................... 370/395 |

\* cited by examiner

Primary Examiner—Chi H. Pham
Assistant Examiner—Kwang B. Yao
(74) Attorney, Agent, or Firm—Gerald R. Woods

(57) ABSTRACT

A packet data switch is described comprising a crossbar switch fabric including a set of crosspoint buffers for storing at least one data packet, one for each input/output pair. An input queue is provided for each input-output pair and means are provided for storing incoming data packets in one of the queues corresponding to an input-output routing for the data packet. An input scheduler repeatedly selects one queue from the plurality of queues at each input and a data packet is transferred from the queue selected by the input scheduler from the input queue means to the crosspoint buffer corresponding to the input-output routing for the data packet. A back pressure mechanism is arranged to inhibit selection by the first selector of queues corresponding to input/output pairs for which the respective crosspoint buffer is full. Finally, an output scheduler repeatedly selects for each output one of the crosspoint buffers corresponding to the output and the switch is responsive to the output scheduler to complete the transmission through the switch fabric of the data packet stored in the crosspoint buffer selected by the output scheduler.

5 Claims, 4 Drawing Sheets

DATA SWITCH

BACKGROUND OF THE INVENTION

1. Field of the Invention

This invention relates to data communications and, more particularly, to a crossbar packet data switch having an improved scheduling mechanism.

2. Background Description

The provision of high speed switching devices is vital to modern packet switched data communications systems, such as those based on Asynchronous Transfer Mode (ATM) technology.

Many types of switching architectures have been proposed and/or implemented in high speed switches. A general review of such architectures can be found in TOBAGI 'Fast Packet Switch Architectures for Broadband Integrated Services Digital Networks' Proc IEEE Vol 78, No 1, pp 133–167, (1990).

In space division type switch architectures, such as those based on crossbar switch matrices, multiple concurrent paths are established from a plurality of inputs to a plurality of outputs, each path only being required to operate at the same data rate as an individual input or output line. One problem with this type of switch architecture is that it is generally not possible for all the required paths from each input to each output to be set simultaneously. This has the result that if two data packets arrive simultaneously at the same input and/or destined for the same output then the passage of such data packets through the switch has to be scheduled so that one of the packets must wait in some kind of buffer or queue.

Various types of queuing and buffering arrangements have been proposed, examples of which can be found in the above mentioned article. A key factor in the design of such arrangements is to balance the requirement for maximum switch throughput and to ensure that the scheduling of the switching paths is fair in the sense that, whatever the input traffic pattern, the amount of traffic allowed to pass through any particular input-output path must receive at least a defined share of the bandwidth on the respective input or output path. This is particularly important in the presence of ATM non-reserved bandwidth (NRB) traffic which can be extremely bursty.

US-A-5267235 and US-A-5500858 describe scheduling arrangements for space-division switches which provide a match between requesters, ie the input adapters of a switch, that must arbitrate for service from one of a number of servers, ie the output adapters of a switch. Each requester presents a set of requests. Requests are presented to all servers to which access is desired. Each server selects one such request and asserts a response signal stating the request selected. Each requester then selects one incoming grant response and deasserts requests to any other servers. In US-A-5267235 it is proposed that the servers select requests on a random or pseudo-random basis. US-A-5500858 proposes a rotating priority approach for selection of requests by the servers and subsequently of a grant response by the requesters.

US-A-5199028 describes a cross point switching array in which a very short queue is provided at each cross point of the switching matrix in order to prevent blocking when more than one input port wishes to send a packet to the same output port at the same time. Packets are loaded from an input queue into the crosspoint queue. A rotating priority output mechanism is used to transfer packets from the crosspoint queues to output ports. This arrangement, however, has less than optimal throughput because at any particular time packets whose input-output path is available at that time may be blocked in the queue by packets higher in the queue whose input-output path is not available -a problem commonly referred to in the art as head of line blocking.

US-A-5392401 describes a switch in which, at each input, there is one input queue per output target. A scheduling mechanism is used in order to select the queue in each input adapter with the rule that, in any given cell time, each input can only send to one output at a time and each output can only receive from one input. Such a structure is relatively simple to implement, but suffers from the drawback that the scheduling algorithm is difficult to optimize.

SUMMARY OF THE INVENTION

It is an object of the present invention to provide a packet data switch which is capable of handling bursty traffic with improved fairness, whilst maintaining switch throughput.

In brief, the invention provides a packet data switch having a plurality of inputs and a plurality of outputs comprising a crossbar switch fabric for directing data packets between any one of the inputs and any one of the outputs.

The switch fabric includes a set of crosspoint buffers for storing at least one data packet, one for each input/output pair. An input queue is provided for each input-output pair and means are provided for storing incoming data packets in one of the queues corresponding to an input-output routing for the data packet.

An input scheduler repeatedly selects one queue from the plurality of queues at each input and a data packet is transferred from the queue selected by the input scheduler from the input queue means to the crosspoint buffer corresponding to the input-output routing for the data packet. A back pressure mechanism is arranged to inhibit selection by the first selector of queues corresponding to input/output pairs for which the respective crosspoint buffer is full.

Finally, an output scheduler repeatedly selects for each output one of the crosspoint buffers corresponding to the output and the switch is responsive to the output scheduler to complete the transmission through the switch fabric of the data packet stored in the crosspoint buffer selected by the output scheduler.

The inventors have found that the combination of an input scheduler operating on a set of input queues together with an output scheduler operating on buffers of limited size situated at the crosspoints of the switch provides a particularly effective arrangement which can handle very bursty traffic, can be fair, have a high throughput and which does not suffer from head of line blocking.

In a preferred embodiment, the input scheduler and/or the output scheduler is or are arranged to operate using a rotating priority, although other priority schemes such as a random selection may be feasible in some implementations. Particularly effective is the double round robin arrangement in which both the input scheduler and the output scheduler use a rotating priority.

In principle, the cross point buffers may be sized to hold any number of data packets, however for practical reasons related to the cost of implementing memory elements within a switch fabric, it is preferable to keep the size of the crosspoint buffers to a minimum. In the preferred embodiment, the crosspoint buffers are sized to hold only one data packet.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
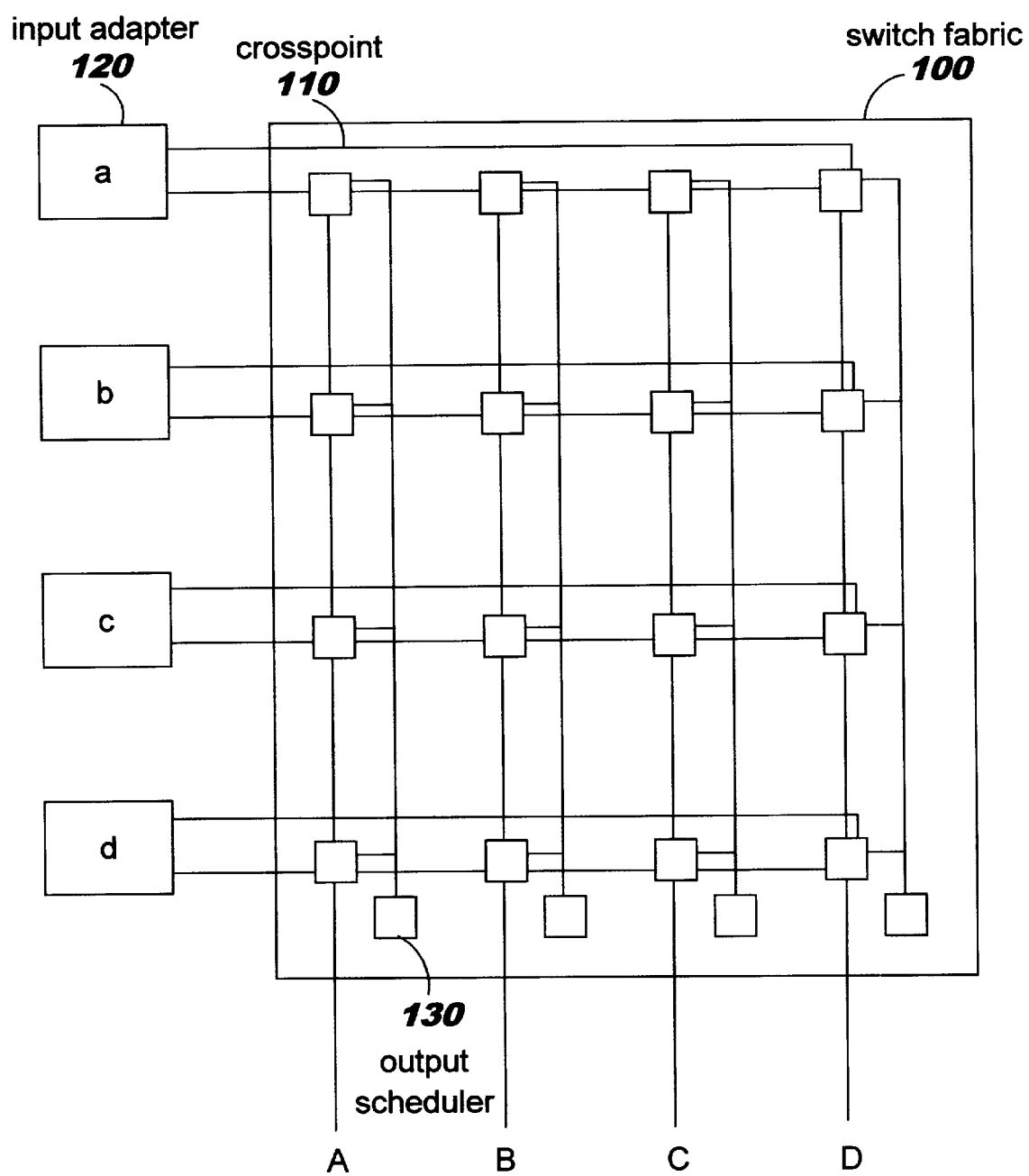
FIG. 1 is a schematic diagram showing a packet switch.

FIG. 1 is a schematic diagram showing a packet switch having four inputs denoted a, b, c, d and four outputs, A, B, C, D. It will be clear to those skilled in the art how the apparatus to be described below may be modified to accommodate different numbers of inputs and outputs.

The switch includes a crossbar switch fabric 100 through which data packets can be transmitted between any one of the inputs and any one of the outputs via crosspoints 110. An input adapter 120 is provided at each input which includes an input queue mechanism, which will be described in more detail below, for temporarily storing data packets whilst they are waiting to be transmitted through switch fabric 100. It will be understood that outputs A,B,C, and D are connected to output adapters (not shown). Output schedulers 130 are provided to schedule the transfer of data packets from the crosspoints 110 to the outputs as will be described in more detail below.

It will be appreciated that in practical embodiments, switch fabric 100 may be connected to a plurality of adapters which each include the functionality of the input and output adapters referred to above and are capable of both transmitting and receiving data packets via the switch fabric.

To reduce control overheads in the application of such a switch to ATM, the data packets include preferably entire 53-byte ATM cells together with appropriate internal routing and control information. However, it will be understood that other sizes are possible for the data packets, such as fixed size portions of ATM cells, eg 4, 8 or 16 byte bursts. In this event, the division of the cells into bursts and the reassembly of the bursts could be handled in known fashion in the input and output adapters respectively.

Figure 2:
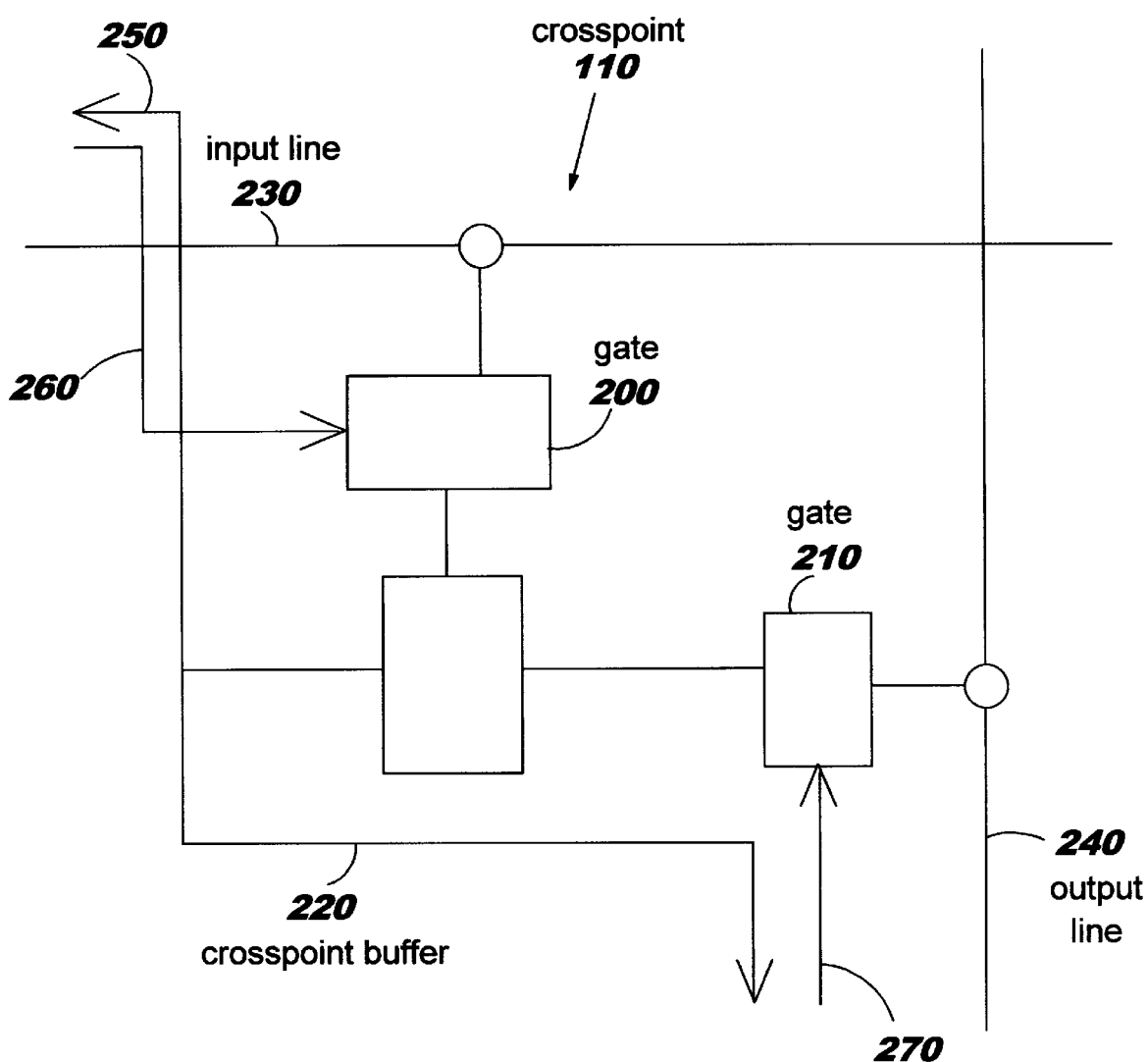
FIG. 2 shows one of the crosspoints of the switch.

FIG. 2 shows in more detail the crosspoints of switch fabric 100. Each crosspoint includes gates 200 and 210 and a crosspoint buffer 220. Crosspoint buffer is large enough to temporarily store one data packet which has been received on input line 230 via gate 200 and is waiting to be transmitted to output line 240 via gate 210. Input line 230 and output line 240 can conveniently be implemented using a serial link.

Figure 3:
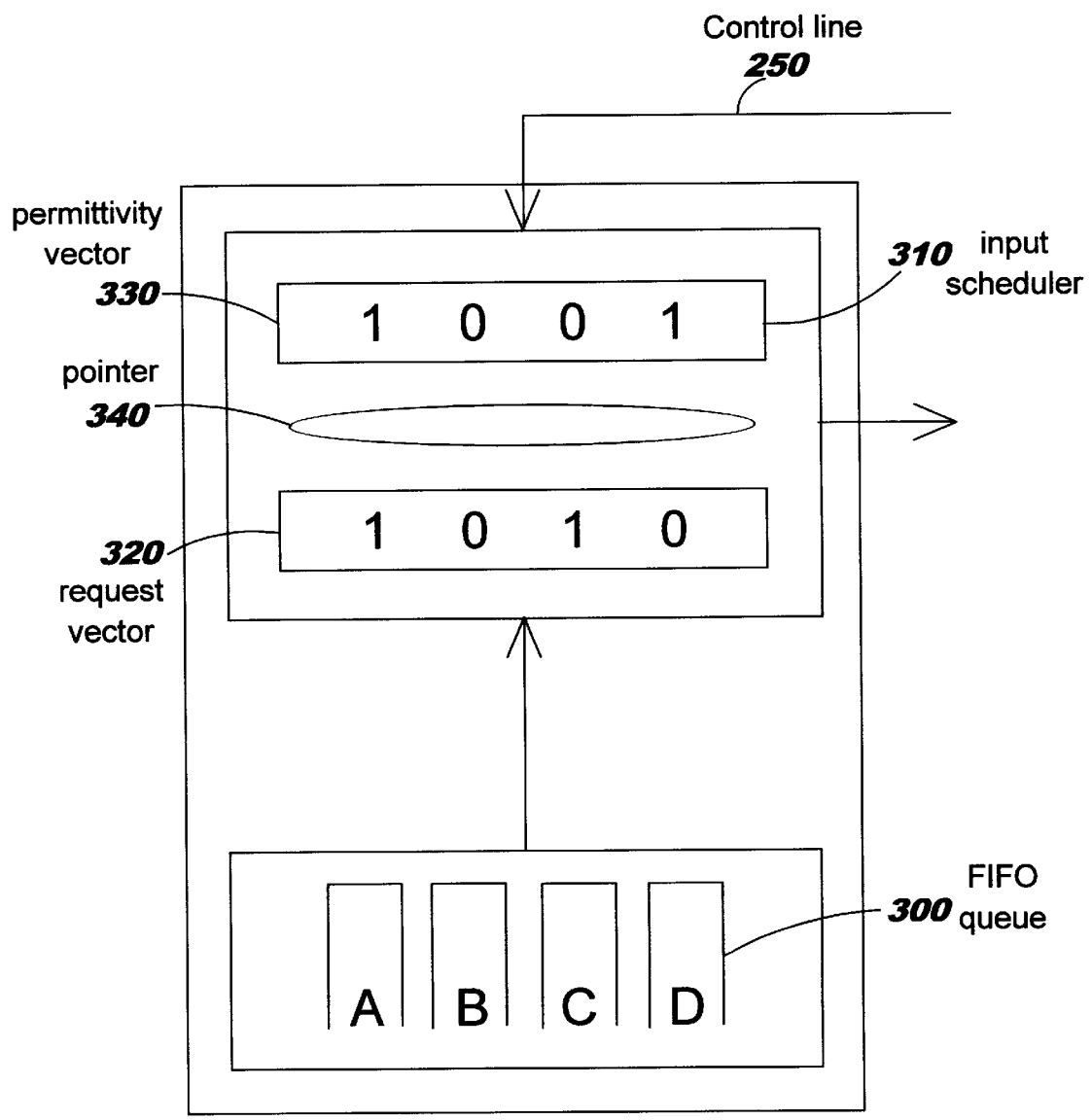
FIG. 3 shows one of the input adapters of the switch.

FIG. 3 shows in more detail the input adapter 120 for each of inputs a, b, c, d. A first in first out (FIFO) queue 300 is provided at each input for each of the outputs A, B, C, D, so that there are a total of 16 queues. The queues 300 are implemented in conventional manner in shared memory within input adapter 120 and incoming data packets are stored in well-known fashion in the queue corresponding to an input-output routing for the data packet.

An input scheduler 310 is provided in each input adapter 120 for repeatedly selecting one queue from which a data packet will be transmitted through the switch. Input scheduler 310 comprises a request vector 320 and permittivity vector 330. Request vector 320 comprises four flags which record whether a data packet is waiting in each output queue. Permittivity vector 330 comprises four flags which record whether or not the corresponding crosspoint buffer for each output can accept a data packet.

Permittivity vector is connected to the crosspoint buffers via control lines 250 and acts as a back pressure mechanism to inhibit selection by the first selector of queues corresponding to input/output pairs for which the respective crosspoint buffer is full.

Input scheduler 310 uses a rotating priority to choose for each cell time an output for which a data packet is waiting in the corresponding one of queues 300 and for which the corresponding crosspoint buffer can accept a data packet.

A pointer, indicated schematically at 340, is provided which indicates which of the input queues is selected for each cell time. The pointer is incremented at each cell time to point to the next queue, skipping queues for which the request vector indicates that the queue is not occupied or for which the permittivity vector indicates that the corresponding crosspoint buffer is occupied.

A data packet is then transferred from the queue selected by scheduler 310 to the corresponding crosspoint buffer via input line 230 and the corresponding one of gates 200 under the control of a gating signal on control line 260.

Figure 4:
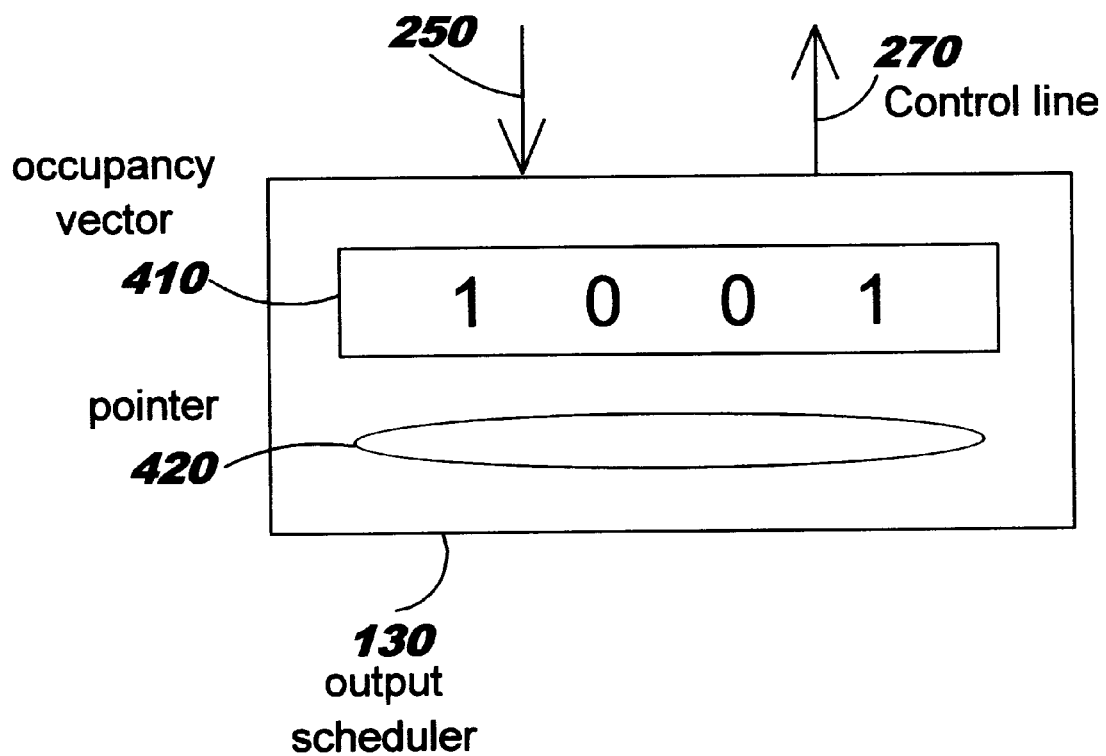
FIG. 4 shows one of the output schedulers of the switch.

FIG. 4 is a schematic diagram showing one of the output schedulers 130. Each output scheduler 130 comprises an occupancy vector 410 which comprises four flags which record whether a data packet is waiting in each crosspoint buffer.

Output scheduler 130 also uses a rotating priority to choose for each cell time a crosspoint queue in which a data packet is waiting.

A pointer, indicated schematically at 420, is provided which indicates which of the crosspoint buffers is selected for each cell time. The pointer is incremented at each cell time to point to the next crosspoint buffer, skipping those for which the occupancy vector 410 indicates that the buffer is not occupied.

A data packet is then transferred from the crosspoint buffer selected by output scheduler 130 to the corresponding output adapter via output line 230 and the corresponding one of gates 210 under the control of a gating signal on control line 270.

The switch is thus responsive to the output scheduler to complete the transmission through the switch fabric of the data packet stored in the crosspoint buffer selected by the output scheduler.

The basic method of operation is therefore as follows:

1. The input pointers 340 are incremented to point to the next occupied queue at each input for which the corresponding crosspoint buffer 220 is not full;
2. The output pointers 420 are incremented to point to the next occupied crosspoint buffer 220;
3. A data packet is transferred from the queue pointed to by each input pointer 340 to the corresponding crosspoint buffer 220;
4. A data packet is transferred from the crosspoint buffer 220 pointed to by each output pointer 420 to the corresponding output.

This process is illustrated in Table 2 for the input pattern shown in Table 1. It is assumed in this example that the queues indicated by 1 in Table 1 contain data packets waiting to pass through the switch fabric. The matrices of Table 2 have the same format as Table 1, ie the rows represent the switch inputs a, b, c, d and the columns the outputs A, B, C, D.

In iteration 1, input pointers are set in each input to point to output a and output pointers for each output are set to point to the crosspoint buffer linked to input A. The state of the input pointers and the output pointers in each interation after incrementation (steps 1 and 2 above) are shown in the second and fifth columns of Table 2 respectively.

In each iteration, the input queue from which a data packet is transferred to a crosspoint buffer is shown in the third column of Table 2. The state of the crosspoint buffers after these transfers is shown in the fourth column and the crosspoint buffer from which a data packet is transferred to the output is shown in column 6.

In this example, it can be seen that, after the first iteration, the algorithm allows four data packets to be switched in each iteration, the maximum possible switch throughput. Moreover, each input-output combination is served in a manner which is fair.

While the invention has been described in terms of preferred embodiments, those skilled in the art will recognize that the invention can be practiced with modification within the spirit and scope of the appended claims.

Having thus presented our invention, what we claim as new and desire to secure by Letters Patent is as follows:

1. A packet data switch having a plurality of inputs and a plurality of outputs, the switch comprising:

a crossbar switch fabric for directing data packets between any one of the inputs and any one of the outputs, the switch fabric including a set of crosspoint buffers, one for each input/output pair, each for storing at least one data packet;

input queue means comprising a queue for each input-output pair and means for storing incoming data packets in one of the queues according to a routing for the data packet;

an input scheduler for repeatedly selecting one queue from the plurality of queues at each input;

means to transfer a data packet from the queue selected by the input scheduler from the input queue means to the crosspoint buffer corresponding to the input-output pair for the queue;

a back pressure mechanism arranged to inhibit selection by the input scheduler of queues corresponding to input/output pairs for which the respective crosspoint buffer is full;

and an output scheduler for repeatedly selecting for each output one of the crosspoint buffers corresponding to the output, the switch being responsive to the output scheduler to complete the transmission through the switch fabric of the data packet stored in the crosspoint buffer selected by the output scheduler.

2. A packet switch as claimed in claim 1 wherein the input scheduler and/or the output scheduler is or are arranged to operate using a rotating priority.

3. A packet switch as claimed in claim 2 wherein the back pressure mechanism includes a permittivity vector for recording whether or not each crosspoint buffer is full.

4. A packet switch as claimed in claim 3 wherein the crosspoint buffers are sized to hold only one data packet.

5. A packet switch as claimed in claim 4 arranged so that the data packets include entire ATM cells.

* * * * *